H. R. ANDREAS.
SIGNAL LAMP.
APPLICATION FILED JUNE 9, 1916.

1,259,821.

Patented Mar. 19, 1918.
2 SHEETS—SHEET 1.

WITNESSES
E. W. Callaghan
C. E. Traver

INVENTOR
Harry R. Andreas,
BY
ATTORNEYS

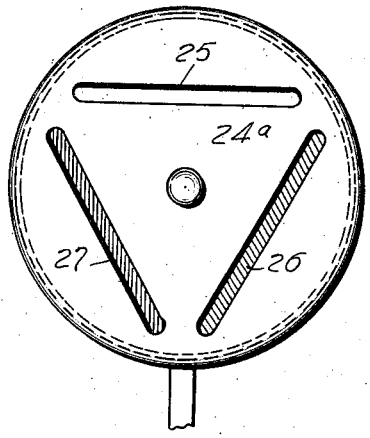
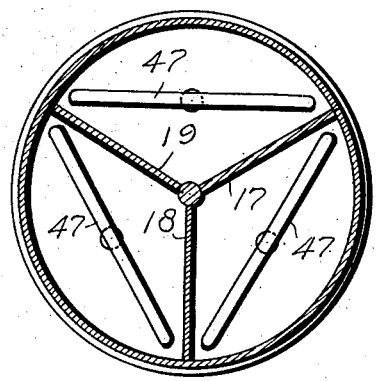
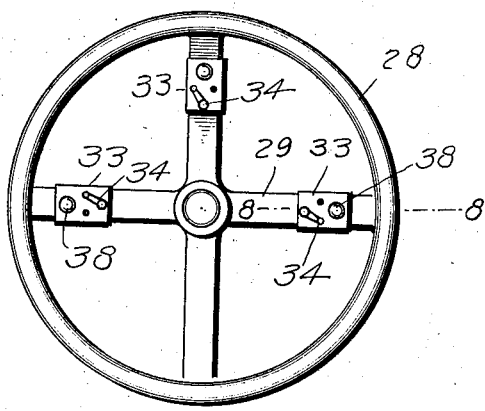
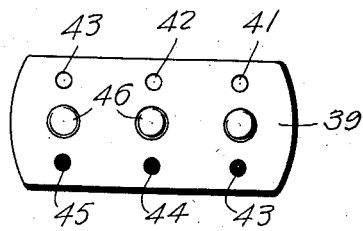
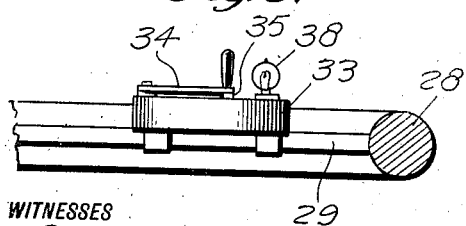
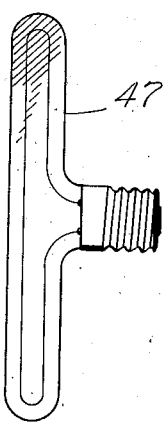

UNITED STATES PATENT OFFICE.

HARRY R. ANDREAS, OF MANILA, PHILIPPINE ISLANDS.

SIGNAL-LAMP.

1,259,821.　　　　　Specification of Letters Patent.　　Patented Mar. 19, 1918.

Application filed June 9, 1916. Serial No. 102,669.

*To all whom it may concern:*

Be it known that I, HARRY R. ANDREAS, a citizen of the United States, of Manila, Philippine Islands, have invented certain new and useful Improvements in Signal-Lamps; and I do hereby declare that the following is a full, clear, and exact description thereof, reference being had to the accompanying drawings, and to the letters of reference marked thereon, which form a part of this specification.

This invention is intended to fill the need of some device whereby an automobile driver may easily signify to following automobiles or motorcycles or other vehicles of whatsoever class, his intention of slowing down and stopping or of changing direction by turning either to the right or to the left, without diverting his attention from the proper management of his own car and what is going on ahead of him, thereby materially contributing to the safety of his own car and those of others following him and especially so in crowded traffic. As will be hereinafter shown, it consists primarily of conventionalized but easily understood signals and the means of displaying them from any suitable point on the rear of his car. While primarily intended for automobiles, it may be applied with suitable modifications of design to motorcycles or to any other class of vehicle as may be desired. With this understanding previously declared and had, the following description can well confine itself to the application of the device to automobiles as hereinafter set forth.

In the drawings:

Fig. 5 is a view similar to Fig. 2 of a modified construction,

Fig. 6 is a view similar to Fig. 4 of the said construction,

Fig. 7 is a plan view of the steering wheel showing the arrangement of the switches, Fig. 8 is a section on the line 8—8 of Fig. 7, Fig. 9 is a plan view of a modified construction of switch, and Fig. 10 is a side view of a modified form of lighting device.

Figure 2:
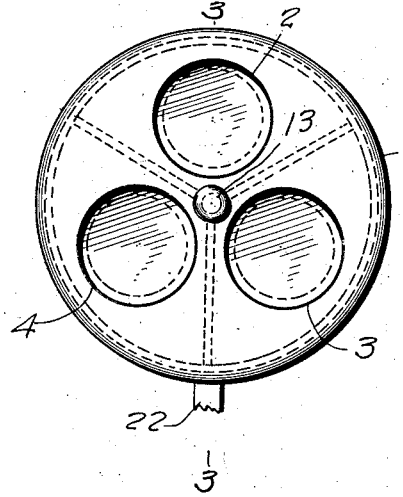
Fig. 2 is a front view of the signal casing.

In Fig. 2, 1 is the dial plate itself; 2, 3, and 4 are suitable openings through which lights may be displayed. The opening 2 shall be fitted with a plain, that is ordinarily natural, glass without color either in the form of a flat plate or in the form of any suitable lens as desired, the same to be so mounted in the opening 2 of plate 1 as to make it perfectly firm and solid in place without shake or rattle according to the best practice of the usual art in making such mountings. Opening 3 of Fig. 2, shall, in a like manner be fitted with a green glass. Opening 4 of Fig. 2, shall, in a similar manner, be fitted with a red glass. Suitable lights being provided behind these glasses or lenses, it follows that a white, or a green, or a red light, or any combination of them can be displayed, and thus a set of easily understood conventionalized signals be built which could indicate to following cars, motorcycles, or other vehicles whatsoever, the intention of the driver. Let us suppose, for example, that the display of the white light would indicate the intention of the driver to slow down or come to a stop; that the display of the green light would indicate his intention to turn to his right; and that the display of the red light would indicate his intention of turning to his left. In this manner, three important signals would be displayed from a suitable point on the back of his car, signifying his intention to following traffic. If desired to carry the system of signaling beyond this point, lights could be shown in combination. Thus, a white and a green light could be shown simultaneously. In a similar manner, a white and a red light could be displayed together, or a green one and a red one, or even a white one and a green one and a red one. In this manner at least seven conventionalized signals could be displayed to the following traffic as desired.

Figure 3:
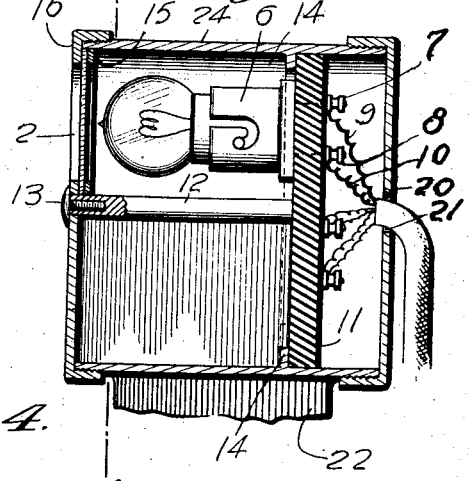
Fig. 3 is a section on the line 3—3 of Fig. 2.

Fig. 3 shows the manner of providing the lights for the signals, only one of which however is displayed in the drawing. In Fig. 3, 24 indicates a cylindrical case, or rather a vertical section of such case and its fittings along the line 3—3 of Fig. 2, in so far as it is necessary to display them for a complete understanding of the matter.

In Fig. 3 also, 11 represents a plate of any suitable non-conducting material for mounting the lamps which light up the signals. This mounting plate, 11, shall be circular in shape and fit snugly inside the cylindrical case. It shall be securely fastened to projections, indicated by 14, suitably provided in the inside of the cylindrical case in at least three suitable places between lamps so as to give it the required stability. It shall be provided with three lamp sockets at suitable points on its surface so that the lamps behind 2, 3, and 4, of Fig. 2, shall be properly placed in relation to them. One such socket is shown in Fig. 3, as 6. This socket may be of any approved design, either that shown in the drawing or any other, that in the drawing offering, however, certain advantages in mounting or replacing bulbs with ease and despatch. As all three sockets would be mounted in an exactly similar manner in their respective places, the display of one of them in the drawing suffices for the display of all three of them. Each lamp socket shall be provided with suitable means of wiring them, such as is shown at 7 and 8 of Fig. 3, one positive and one negative to each socket, from which suitable means of connection, properly insulated wires, 9 and 10, should lead to the electric system and switches. For each socket, an electric light of the incandescent type of suitable candle-power and internal resistance, shall be provided so as to display the signals in a proper manner as desired and as indicated above.

Figure 4:
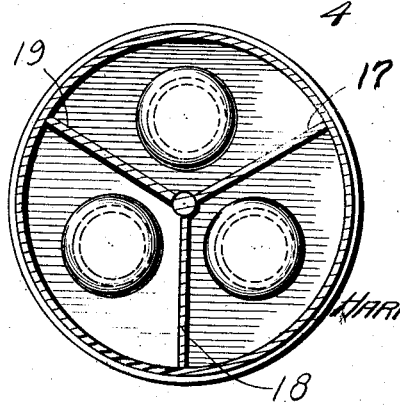
Fig. 4 is a section on the line 4—4 of Fig. 3.

In order that the various lights shall act entirely independent of each other, the cylindrical chamber 24 shall, on the lighting side of 11, be divided into three distinct and separate chambers by three radial partitions, 17, 18, and 19, of Fig. 4, radiating from the center post, 12, at angles of 120 degrees from each other. The interior of each lamp chamber should be painted white so as to reflect all the light possible and project it through the respective openings, 2, 3, and 4, of Fig. 2. Plate 1, at its outer edge, shall be supported in place by a circular ring, 15, suitably provided in 24, against which circular ring it shall rest. It shall then be secured in place by screwing down against it the marginal flange 16, of Fig. 2. In order further to prevent vibration, it shall moreover be supported in the center by the post, 12, of Figs. 3 and 4. Its center shall be firmly fixed to the post, 12, by means of the screw, 13, which shall pass through the center of 1 by means of the suitably provided hole, of Fig. 2, and thence into a properly threaded hole in the end of 12. The wiring being properly accomplished, the back of the case 24, shall be properly closed by means of a screw cap, 20, of Fig. 3, a hole, 21, of Fig. 3, being suitably provided in the center of the cap for allowing the exit of the wires needed for making the necessary connections with the magnetic system of the car and for turning on the lights as needed or desired to show the various signals.

This device shall be securely and firmly fastened to a bracket, a portion of which is displayed in Fig. 3, as 22. This bracket may assume any desired form needed for mounting the device on any rear portion of the car from which it is desired to display the signals, the only requisite being that it be of suitable strength and design so as to prevent working loose and rattling under the vibration brought about by the motion of the car.

The wiring system, after leaving the device hereinabove described shall be conducted in a suitable manner to a switch mounted either on the steering wheel or other suitable place within easy reach of the driver, which switch may be of any approved design according to the standard art of making such devices. If mounted on the steering wheel, it may well assume the form displayed in Fig. 7. In this figure, 28 is the outer rim and 29, is the radial spokes of a four spoke steering wheel. On spokes 29, switches for the white light, the red light, and the green light, could be well mounted. For ease of operation as thus mounted they might well assume the lever type. Here, 33 represents the switch base, 34 represents the switch lever, 35 represents the switch contact. In Fig. 7, 38 represents a small counter lamp properly placed in the circuit. This counter light is inserted for the purpose of indicating to the driver that his rear signals are operating properly.

Should the switch be placed in any other place than on the steering wheel, it might still be of the lever type but might preferably be of the double push-button type as displayed diagrammatically in Fig. 9 which shows the key or base board thereof. It should consist of two rows of buttons with three buttons to the row. In this manner one bank of three buttons could serve to switch on the lights and the other bank of three buttons could serve to switch them off. The whole should be constructed in such size as to lie conveniently under the three principal fingers of the hand in such a manner that any one of them, or any two of them, or all of them, may be conveniently operated at one time as desired. With this preliminary explanation, 39 in Fig. 9 represents the general outline of such a switch. In the same Fig. 9, 40, 41, and 42, represent one bank of push-buttons which could be utilized for switching on the lights, while 43, 44, and 45, represent the corresponding push buttons for switching off the corresponding lights. Here again counter lights 46 should be inserted in order to indicate to the driver that his rear signals are operating properly. These may be inserted in any convenient manner according to the generally recognized principles of the art of accomplishing such things provided that they are so placed as to be easily observed by the driver. Whatsoever type of switch be used whether of the lever or push-button type, it should in all cases be properly housed so as to protect it in a proper manner.

The wiring through these switches should also connect properly with the electric system of the car in order to furnish the necessary current to the signal lamps. In case the car has an electric system of greater tension than that needed for the lamps used, they shall be properly shunted according to the well-known principles of electric application which need not be entered into here. If desired, the current for the lamps may be supplied by a system of independent batteries of the desired tension.

As the wiring and switches could follow no other lines than those laid down by the well-known principles of electricity as applied to such matters, detailed descriptions beyond those set forth above, seem not to be needed in relation to them.

A perhaps preferable form of face plate is shown in Fig. 5, in which 24ª is another front view of said plate and in which 25, 26, and 27, are elongated openings corresponding to 2, 3, and 4, respectively, of Fig. 2. In this form, the white light would show as a horizontal bar of light, the red light would show as a bar of light inclined to the left, and the green light would show as a bar of light inclined to the right. A species of double signal would be created thereby, making the signal and the intention of the driver more unmistakable. A different type of electric bulb would have to be used under such circumstances, however, one of an elongated type such as that indicated at 47 in Fig. 10, which is sufficiently clear in itself and needs no detailed description. Should this type of signal be used, an adjustment of the interior of 24 of Fig. 3, would have to be brought about in order to make it accommodate itself to the bulb used. Since, however, it would in all other respects remain the same, detailed descriptions of it under these modifications need scarcely be entered into here, those set forth above amply illustrating the matter at issue.

It is evident, from what has been set forth above, that, from the manufacturer's point of view, the herein described device might, in the very nature of the case, assume a great variety of forms to suit individual taste and preference. The face plate alone might be variously modified. Thus, instead of the round lights shown in Fig. 2 or the bar lights shown in Fig. 10, lozenge shaped lights or oval shaped lights might be displayed.

Figure 1:
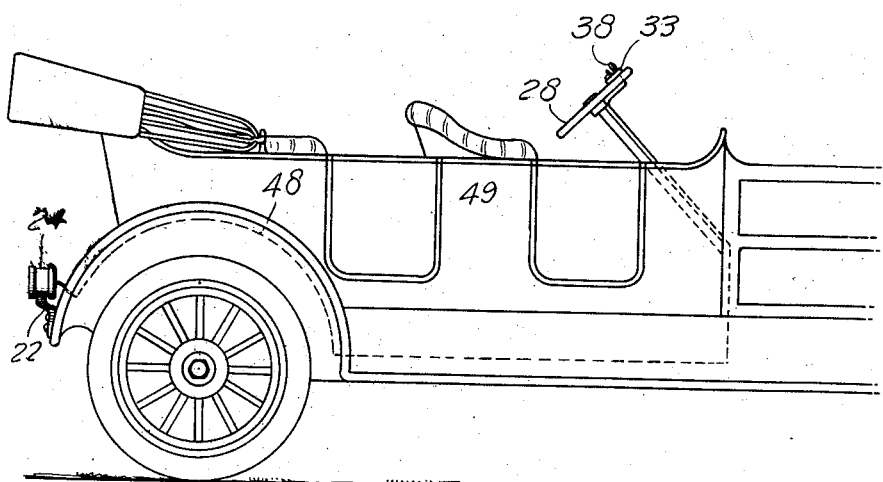
Figure 1 is a side view of an automobile provided with the improved signal.

In Fig. 1 the improvement is shown applied to an automobile, the casing 24 being mounted on the fender 48 of the rear wheel of the vehicle 49, and in the present instance the device is mounted on the fender at the right. It is obvious, however, that it might be mounted directly on the vehicle or in any other desired position.

Having thus described my invention, what I claim, and desire to secure by Letters Patent, is:

Signaling means comprising a casing having inner projections, a plate within the casing and secured to the said inner projections, a center post projecting forwardly from the inner plate, an outer plate closing the front of the casing and receiving the post at its center and having a plurality of regularly spaced openings, means for securing the front plate to the casing and center post, radial partitions held between the front and inner plates and having their inner edges in contact with the center post and their outer edges in contact with the inner walls of the casing, said partitions dividing the forward portion of the casing into light chambers opposite the respective openings in the front plate, transparent plates of different colors covering the respective openings of the front plate, lamps disposed in the light chambers and attached to the inner plate, and a cap closing the rear end of the casing and having an opening for the passage of the wires leading to the several lamps.

In testimony whereof, I have signed my name to this specification, in the presence of two subscribing witnesses, on this 18th day of April, 1916, A. D.

HARRY R. ANDREAS.

Witnesses:
WILLIAM S. IREY,
VICENTE P. MACAKIN.